Dec. 11, 1934.     H. S. HELE-SHAW ET AL     1,983,884
HYDRAULIC CONTROL GEAR
Filed March 6, 1934
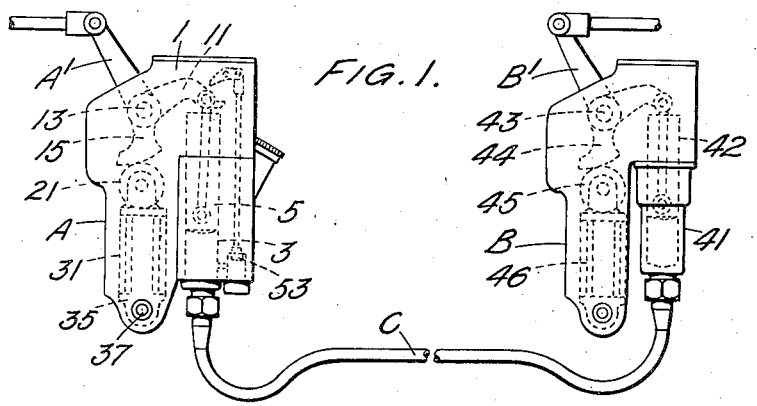
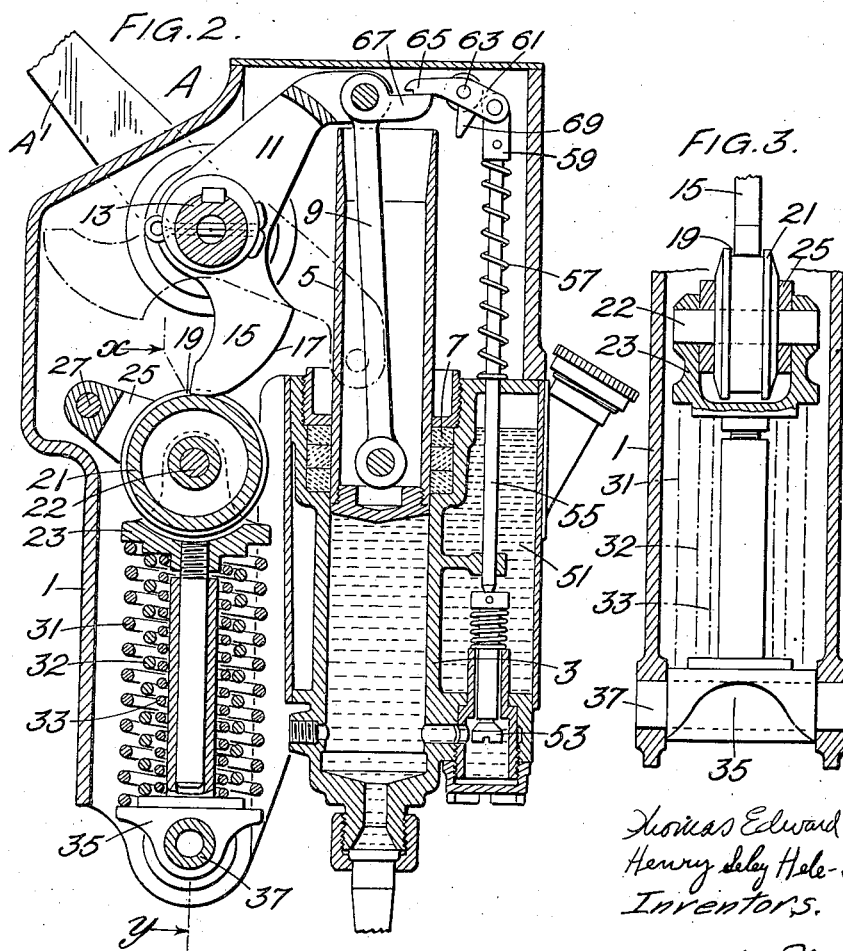
Thomas Edward Beacham,
Henry Selby Hele-Shaw
Inventors.
Per, C. Yge Fraser
Atty.

Patented Dec. 11, 1934

1,983,884

UNITED STATES PATENT OFFICE 1,983,884

HYDRAULIC CONTROL GEAR

Henry Selby Hele-Shaw and Thomas Edward Beacham, Westminster, London, England

Application March 6, 1934, Serial No. 714,334
In Great Britain May 13, 1933

8 Claims. (Cl. 60—54.5)

The present invention concerns improvements in hydraulic remote control gear consisting of controlling and controlled stations connected by a column of liquid in a duct of the type (hereinafter called the type referred to) which comprises at the controlling station a transmitter cylinder having a piston therein and communicating with the said duct, and means to move the transmitter piston, and at the controlled station a receiver cylinder having a piston therein and communicating with the said duct, and means to be moved by the receiver piston.

Hydraulic controls of the type referred to are usually provided with duplicate pipe connections having pumps, valves and other accessories for each system of piping so that movement in reverse directions may be transmitted. To overcome this duplication it has been proposed to provide only one pipe connection for transmitting movement from a control lever to a controlled element in one direction, and to provide a spring for moving the controlled element reversely when permitted by reverse movement of the control lever and the associated piston. Such a construction reduces the liability to trouble, reduces the weight and friction, and simplifies the mechanism by reducing for example, the number of valves. This arrangement, however, suffers from the disadvantage that the controlled element may not, in certain circumstances, accurately follow movement of the control lever in the spring-operated direction.

One object of the present invention is to provide remote control apparatus of the type referred to whereby although only a single pipe connection is used yet the controlled element shall be moved to follow the control movement accurately in both directions, thus obtaining with a single pipe connection the advantages of a double pipe connection.

Another object is to provide remote control apparatus such that movement of the controlled element shall correspond very accurately to the movement of the controlling element and shall do so in both directions with equal accuracy.

A further object is to provide remote control apparatus in which there shall be automatic compensation for alteration in volume of liquid in the system, for example, due to leakage of the transmitting liquid past the pistons, or due to expansion or contraction of liquid due to change of temperature. Such compensation is particularly useful in connection with aeroplanes which are subject to rapid and abnormal changes of temperature and barometric pressure.

Another object is to provide remote control apparatus which shall be practically self-locking in all positions.

It is contemplated that control gear according to the invention will be particularly suitable for remote control of carburettors for internal-combustion engines, steam-valves, ships telegraphs, and like apparatus.

The invention will become more fully apparent from the following description, in conjunction with the accompanying diagrammatic drawing, of one apparatus illustrative of the invention.

In the drawing,

Fig. 1 is a diagram indicating the general layout of the apparatus;

Fig. 2 shows the transmitting end in elevation, partly in section;

Fig. 3 is a part sectional elevational view, on the line $x-y$ of Fig. 2.

The illustrative apparatus now to be described is for throttle control on an aircraft and comprises a transmitter A, a receiver B, and a single line of small-bore copper piping C which connects A and B; flexible piping may be used if desired, for example, if A or B require to be moved. The transmitter A is mounted in the cockpit of the aircraft and is provided with an actuating lever A' for control by the pilot, but any convenient actuating device may be used. The receiver B is mounted adjacent to the throttle to be controlled and is provided with a lever B' which is connected to the throttle by any convenient means.

The transmitter A comprises a casing 1 enclosing a vertical cylinder 3 having a trunk-type piston 5 and a gland 7 for making the cylinder fluid-tight. A connecting rod 9 connects the piston 5 to a crank-arm 11 fixed to a rock-shaft 13 which is mounted in the casing 1 and which has fixed to it the actuating lever A'. Also fixed on the shaft 13 is a cam-arm 15 having a cam surface 17 which contacts with a circular groove 19 in a roller 21 which is carried upon ball bearings by a pivot-pin 22 in a bracket 23. In this particular construction the bracket is guided for up-and-down movement by being pivoted to a link 25 which is pivoted at 27 to the casing, but any other convenient guide means may be used. The bracket 23 is resiliently upheld by three compression springs 31, 32, 33 resting on a support and guide 35 which is pivoted at 37 to the casing 1 and to which the bracket 23 is slidably connected. By reason of this construction the liquid which fills the cylinder is during action kept always under compression by the springs. The shape of the cam surface 17 is such that the leverage decreases as the springs are compressed so that the springs will exert practically uniform effect upon the piston throughout the working stroke of the latter. Thus compensation is effected for variation in spring pressure due to change in length thereof.

The receiver B is practically identical with the transmitter A as so far described, being provided with a cylinder 41 of the same diameter as the cylinder 3, a piston 42, a shaft 43 on which is fixed the lever B', a cam-arm 44, a roller 45, and springs 46. The cylinders and connecting piping are filled with a non-freezing liquid. As the cylinder 41 is of the same diameter as the cylinder 3, downward movement of the piston 5 will produce an equal upward movement of the piston 42. The effect of the springs 46 is arranged to be exactly the same as the effect of the springs 31, 32, 33 so that the system is normally in equilibrium, and the friction in the system will cause the apparatus to be practically self-locking in any position; also the liquid is constantly under the pressure of the springs. The strength of the receiver springs 46 is such that when the transmitter lever A' is moved to raise the piston 5, they will overcome friction and move the piston 42 downwards to a similar amount. Thus the movement of one piston will exactly correspond to the movement of the other without lost motion.

The system as so far described would be satisfactory for many purposes, but where it is required to operate for long periods without attention and to transmit movement extremely accurately there might be a loss of synchronism due to creep as a result of the cumulative effect of leakage; similar loss might be produced by contraction or expansion of the liquid due to changes of temperature. To provide against this an automatic synchronizing device is provided; in the case of the present aircraft apparatus this device comes into action at one end of the stroke.

This synchronizing device will now be described. Attached to the transmitter cylinder 3 is a liquid reservoir 51, the lower end of which communicates with the lower end of the cylinder 3. The communicating aperture is closed by a valve 53 on the lower end of a rod 55 which passes through the top of the reservoir 51; a compression spring 57 between the top of the reservoir and a collar 59 on the upper end of the rod 55 normally keeps the valve 53 closed. This collar 59 is pivoted between the forked end of a rocker 61 which is pivoted at 63 to the casing 1 and which has a reversely-projecting toe 65. This toe overlies a finger 67 which is supported by the crank-arm 11. An ear 69 attached to the rocker 61 will prevent (by contact with the collar 59) the rocker being rocked upwardly and the toe 65 downwardly so far as to clear the toe 65 from the path of the finger 67. The apparatus is so arranged that after the piston 42 has reached the bottom end of its stroke, the piston 5 can be moved still further upwards to a small extent. During this further movement the finger 67 will lift the toe 65 and open the valve 53. Consequently, if any liquid has escaped the loss will be made good from the reservoir; if on the other hand the liquid has expanded the valve will be opened somewhat before the piston 42 has reached the bottom of its stroke, pressure will be relieved, and the piston 42 will be forced by its springs to the end of its stroke and surplus liquid expelled into the reservoir. Thus a single valve compensates for both under and excess pressure. During that part of the movement of piston 5 which opens the valve the pressure of the springs 31, 32, 33 becomes zero, since the roller 21 is then in contact with a part of the cam which has a uniform radius, and the cam-arm moves into a dead-centre position. Thus when liquid pressure in the system is destroyed by the opening of the valve 53 the lever A' is automatically relieved from the force of the springs which it would otherwise have to withstand.

The reservoir 51 is provided with a normally closed aperture which can be used for filling or for releasing air.

When the actuating lever A' again moves the transmitter piston 5 downwardly the valve 53 will be open during the first part of the stroke but by the time the finger 67 is leaving the toe 65 the valve 53 will have closed and further movement of the transmitter piston 5 will effect an exactly equal movement of the receiver piston 42.

It is to be observed that in some cases it may be convenient to connect the piston to the rocker shaft by means of rack-and-pinion instead of by connecting rod and crank-arm.

The construction just described is suitable for operations in which movement is required only to one side of an "off" position. It may be used also in the case where movement is required to opposite sides of an intermediate position provided that it is considered sufficient that the synchronizing device should operate only at the end of one of the side movements; for example, it might be effective in cases where a normal movement was in use in general and a reverse movement was used seldom and was followed comparatively quickly by normal movement. There are, however, numerous cases in which it is desirable that the synchronizing device should operate in connection with the strokes to both sides, and a modified construction may then be used.

What we claim is:—

1. Hydraulic remote control apparatus consisting of controlling and controlled stations, a duct connecting said stations and containing a column of liquid, each of the controlling and controlled stations comprising a chamber communicating with said duct, a piston movable in said chamber, resilient loading means tending to move said piston in one direction and automatic compensating means operative between said loading means and said piston to maintain uniformed loading of said piston.

2. Hydraulic remote control apparatus comprising, in combination with a duct for hydraulic fluid, at a controlling station, a chamber communicating with the said duct, a piston movable in said chamber, an actuating element for moving said piston, resilient loading means arranged to assist such movement in one direction and compensating means operative between said loading means and said actuating element, and, at a controlled station, a chamber communicating with the duct, a piston movable in said chamber, an actuated element connected to said piston for movement thereby, resilient loading means arranged to resist such movement in one direction and compensating means operative between said loading means and said actuated element, the two compensating means aforesaid being adapted for maintaining a substantially balanced condition of the controlling and controlled elements throughout the working stroke of the pistons.

3. Hydraulic remote control apparatus comprising cylinders, an hydraulic fluid duct connecting said cylinders, controlling and controlled pistons in said cylinders, an actuating element connected to the controlling piston, an actuated element connected to the controlled piston, and resilient means acting upon the pistons, movement of the actuated element being effected in one direction by movement of the column of fluid in the duct and in the other direction by the resilient means, the apparatus comprising also variable leverage compensating means located between the resilient means and the associated pistons and operative for applying a uniform loading to the latter so that no out-of-balance loading is thrown upon the actuating and actuated elements.

4. Hydraulic remote control apparatus comprising a transmitter cylinder, a receiver cylinder, a piston in each cylinder, a single pipe connecting the said cylinders, liquid in the pipe and cylinders whereby movement of the transmitter piston is imparted to the receiver piston, resilient means acting upon the pistons and tending to cause said pistons to move to like ends of their strokes, and compensating means for rendering the effect of the resilient means uniform throughout the working stroke of the pistons.

5. Hydraulic remote control apparatus comprising a cylinder and a piston at both the controlling and the controlled stations, a single pipe connecting the cylinders, liquid in the pipe and cylinders whereby movement of the controlling piston is imparted to the controlled piston, resilient means at each station acting upon the pistons to keep the liquid always under pressure during the working stroke of said pistons, and compensating means associated with the resilient means for ensuring that the forces of said resilient means are uniform throughout the working stroke of the pistons 6. Hydraulic remote control apparatus consisting of controlling and controlled stations and a hydraulic fluid duct connecting said stations, each of said stations comprising a cylinder communicating with said duct, a piston movable in said cylinder, an external element (a controlling and controlled element respectively), crank means operatively connecting said elements to said pistons, a helical spring system, and cam means through which said spring system acts upon said crank means, the spring systems acting through said cam and crank means and the hydraulic fluid in opposition to each other in such manner as to maintain said fluid under pressure throughout the working stroke of the pistons, and said cam means being adapted for rendering the action of said spring systems uniform throughout said working stroke.

7. Hydraulic remote control apparatus according to claim 6, wherein the cam means are arranged to enter a dead centre condition approximately at one end of the piston stroke so that the fluid is relieved of pressure at the said stroke-end, and the apparatus, at the controlling station, comprises further a fluid reservoir, self-closing valve means controlling communication of said reservoir with the fluid duct, and means associated with the crank means for automatically opening said valve means approximately at the aforesaid stroke-end to permit of rectification of the effective volume of hydraulic fluid in the apparatus.

8. Hydraulic remote control apparatus comprising cylinders and pistons working in said cylinders at controlling and controlled stations, a single hydraulic fluid duct connecting said cylinders, spring systems, and compensating means through which said spring systems exert a substantially uniform loading upon said pistons throughout their working stroke.

HENRY SELBY HELE-SHAW.
THOMAS EDWARD BEACHAM.